(12) United States Patent
Best et al.

(10) Patent No.: US 7,818,373 B2
(45) Date of Patent: Oct. 19, 2010

(54) NOTIFYING CO-RECIPIENTS OF OTHERS CURRENTLY REPLYING TO COMMUNICATIONS

(75) Inventors: Steven F. Best, Georgetown, TX (US); Robert J. Eggers, Jr., Austin, TX (US); Janice M. Girouard, Austin, TX (US); Janani Janakiraman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 198 days.

(21) Appl. No.: 12/099,214

(22) Filed: Apr. 8, 2008

(65) Prior Publication Data

US 2009/0254620 A1  Oct. 8, 2009

(51) Int. Cl.
G06F 15/16 (2006.01)
H04W 4/00 (2009.01)

(52) U.S. Cl. ........................ 709/204; 455/466
(58) Field of Classification Search .............. 709/204; 455/466
See application file for complete search history.

(56) References Cited

U.S. PATENT DOCUMENTS

| | | | | |
|---|---|---|---|---|
| 5,649,131 | A * | 7/1997 | Ackerman et al. | 715/744 |
| 5,835,922 | A * | 11/1998 | Shima et al. | 715/209 |
| 6,473,787 | B2 | 10/2002 | Miloslavsky | |
| 6,501,834 | B1 | 12/2002 | Milewski et al. | |
| 6,654,791 | B1 | 11/2003 | Bates et al. | |
| 6,992,991 | B2 * | 1/2006 | Duske et al. | 370/316 |
| 7,362,349 | B2 * | 4/2008 | Nelson et al. | 348/14.08 |
| 7,418,497 | B2 * | 8/2008 | Hagale et al. | 709/224 |
| 7,451,917 | B2 * | 11/2008 | McCall et al. | 235/379 |
| 7,519,912 | B2 * | 4/2009 | Moody et al. | 715/753 |
| 7,565,534 | B2 * | 7/2009 | Starbuck et al. | 713/168 |
| 7,606,562 | B2 * | 10/2009 | Aaltonen et al. | 455/414.1 |
| 2001/0011299 | A1 | 8/2001 | Kohda et al. | |
| 2004/0145608 | A1 | 7/2004 | Fay et al. | |
| 2004/0179039 | A1 * | 9/2004 | Blattner et al. | 345/758 |
| 2004/0225640 | A1 * | 11/2004 | Brown et al. | 707/3 |
| 2004/0236721 | A1 * | 11/2004 | Pollack et al. | 707/2 |
| 2005/0027669 | A1 * | 2/2005 | Day et al. | 707/1 |

(Continued)

FOREIGN PATENT DOCUMENTS

JP  2001-184275  7/2001

*Primary Examiner*—Saleh Najjar
*Assistant Examiner*—Vitali Korobov
(74) *Attorney, Agent, or Firm*—Francis Lammens; Stephen J. Walder, Jr.; Steven L. Bennett

(57) ABSTRACT

A mechanism for notifying co-recipients of a communication that other recipients are currently composing a reply to the received communication is provided. The notification may be provided regardless of which type of communication application is being used to reply to the communication. With this mechanism, attribute information for a communication currently being composed on a client communication device using one of a plurality of different communication types is obtained. The attribute information may include an identifier of a communication type currently being used to compose the communication. A previously distributed communication related to the communication currently being composed is identified and one or more recipients of the previously distributed communication are identified. A notification message is sent to one or more communication devices associated with the one or more recipients of the previously distributed communication. The notification message may identify a communication type currently being used to compose the communication.

23 Claims, 6 Drawing Sheets

U.S. PATENT DOCUMENTS

| | | |
|---|---|---|
| 2005/0027803 A1 | 2/2005 | Kelley et al. |
| 2005/0071427 A1* | 3/2005 | Dorner et al. ............... 709/204 |
| 2005/0165584 A1* | 7/2005 | Boody et al. ................ 702/186 |
| 2005/0198305 A1 | 9/2005 | Pezaris et al. |
| 2006/0031356 A1 | 2/2006 | Drouet et al. |
| 2006/0075351 A1 | 4/2006 | Brumfield |
| 2006/0184557 A1* | 8/2006 | Pollack et al. .............. 707/101 |
| 2006/0239420 A1 | 10/2006 | Hollatz et al. |
| 2006/0277263 A1 | 12/2006 | Daniels et al. |
| 2007/0123223 A1* | 5/2007 | Letourneau et al. ...... 455/414.1 |
| 2007/0266097 A1* | 11/2007 | Harik et al. ................. 709/204 |
| 2009/0018910 A1* | 1/2009 | Jung et al. .................... 705/14 |

* cited by examiner

NOTIFYING CO-RECIPIENTS OF OTHERS CURRENTLY REPLYING TO COMMUNICATIONS

BACKGROUND OF THE INVENTION

1. Field of the Invention

The present application relates generally to an improved data processing apparatus and method and more specifically to an apparatus and method for notifying co-recipients of a communication about other recipients replying to the communication.

2. Background of the Invention

In today's society, communications are more and more reliant on data networks to provide the connectivity between users for transmitting and receiving such communications. As such, many different forms of communication have been developed including electronic mail, instant messaging, and the like. Each of these different communication mechanisms provide different user experiences and are good for different desired forms of communication. For example, electronic mail messaging allows users to compose elaborate messages, attach and/or embed files within the electronic mail message, keep easily accessible histories of electronic mail messages, and the like.

Instant messaging communications provide real-time communication that allows easy collaboration that are more akin to genuine conversations than electronic mail which is more of a "letter" format type of communication. In contrast to electronic mail, with instant messaging communications, the parties generally know whether another party is available or not since most systems allow the users to set their on-line status or away message so that parties are notified whether the user is available, busy, or away from their computer. With some instant messaging systems, it is possible to maintain logs of instant messages, making them more permanent in nature than previous instant messaging systems, thereby blurring the distinctions between electronic mail and instant messaging systems.

It is often the case with widely distributed communications, such as via electronic mail and instant messages, that a single communication may result in a multitude of replies, all generally saying the same thing. Some communication systems, such as instant messaging communication systems, attempt to mitigate such repetitious replies by providing an indicator of a party presently involved in replying to a previous instant message communication. That is, if an instant message is sent to another instant messaging party, if that party begins to respond to the received instant message, an indicator may be provided stating that the party is currently involved in providing a reply. This allows others to complete a reply or comment to a group without being typed over or being side tracked with duplicate reply messages.

BRIEF SUMMARY OF THE INVENTION

In one illustrative embodiment, a method, in a data processing system, is provided for providing a notification of a recipient of a communication responding to the communication. The method may comprise receiving an indication of a communication currently being composed on a client communication device using one of a plurality of different communication types. The method may further comprise identifying a previously distributed communication related to the communication currently being composed. The previously distributed communication may be of a different communication type than that of the communication currently being composed. Moreover, the method may comprise identifying one or more recipients of the previously distributed communication. Further, the method may comprise sending a notification message to one or more communication devices associated with the one or more recipients of the previously distributed communication. The one or more communication devices may output a notification output identifying that a communication is currently being composed in response to the previously distributed communication.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
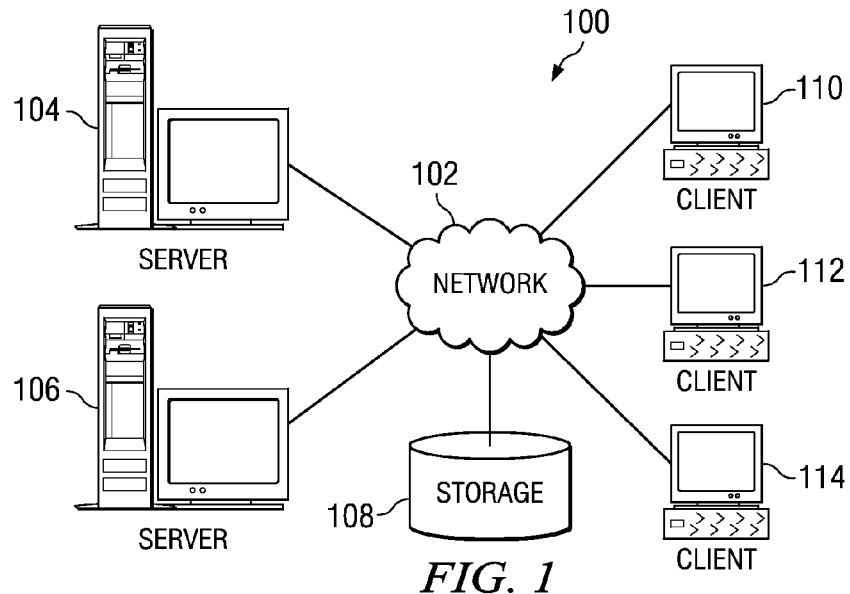
FIG. 1 is an exemplary block diagram of a distributed data processing system in which exemplary aspects of the illustrative embodiments may be implemented.

The illustrative embodiments provide mechanisms for notifying co-recipients of other parties currently replying to communications. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The mechanisms of the illustrative embodiments operate across multiple communication systems such that notifications may be provided regardless of which communication system is being used by the party providing a reply to a communication. Moreover, the mechanisms of the illustrative embodiments provide an interface through which a user may immediately access a communication system being used by a party to reply to a previous communication. These mechanisms may be used to monitor replies to communications that are widely distributed and thus, may have many recipients and a high likelihood of repetitions replies.

Figure 2:
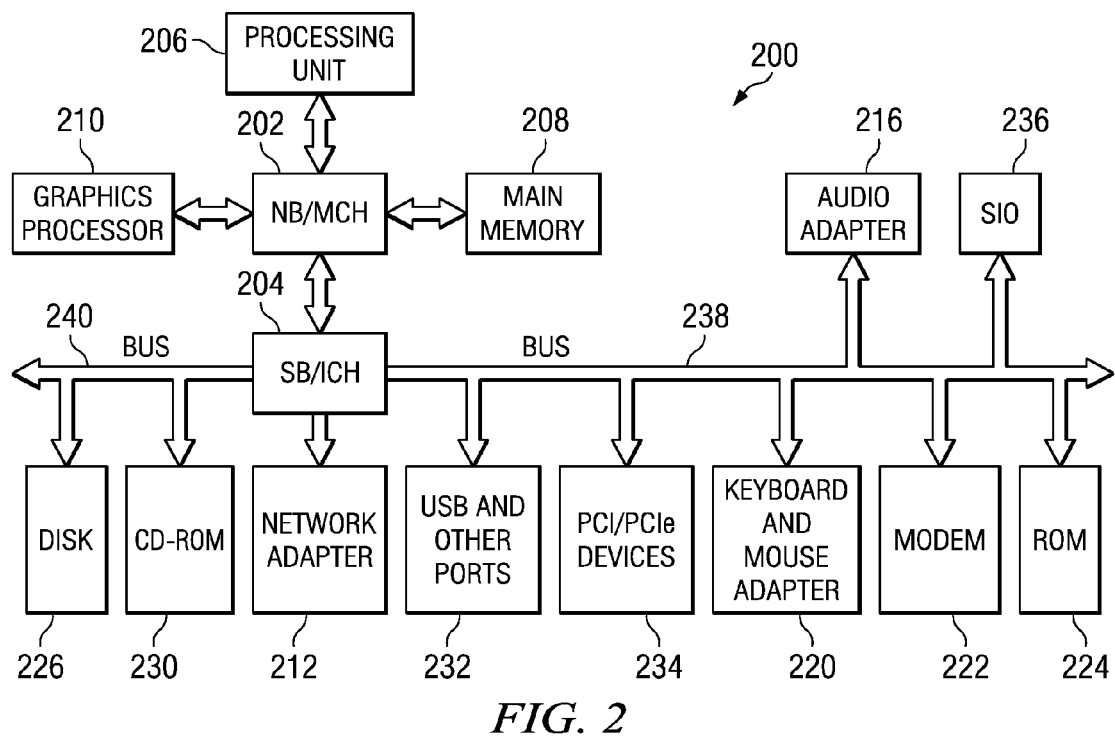
FIG. 2 is an exemplary diagram of a computing system in which exemplary aspects of the illustrative embodiments may be implemented.

Thus, the illustrative embodiments are especially well suited for use with a distributed data processing environment in which recipients of communications may be widely disbursed to users of computing devices via one or more data networks. In order to provide a context for the description of the specific elements and functionality of the illustrative embodiments, FIGS. 1 and 2 are provided hereafter as exemplary environments in which exemplary aspects of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, users of client computing devices 110, 112, and 114 may communicate with each other via the data network 102 using a variety of different communication applications and systems. For example, the computing devices 110, 112, and 114 may utilize electronic mail, short message service (SMS), instant messaging applications, voice messaging applications, and the like, to communicate with each other and other client computing devices via the data network 102. These various applications may pass communications through one or more servers, such as server 104 and 106, for distribution to the appropriate client computing devices designated as recipients of the communications. For example, server 104 may provide an electronic mail server for handling the receipt and distribution of electronic mail messages to identified recipients of the electronic mail messages. The server 106 may provide an instant messaging server for handling receipt and distribution of instant messages to identified recipients of the instant messages.

In one illustrative embodiment, a server, such as server 104, may further provide a unified communication monitoring system for monitoring communications from a plurality of different communication systems, e.g., electronic mail, instant messaging, SMS, etc. The unified communication monitoring system may monitor communications between client computing devices 110, 112, and 114 via a plurality of different communication systems including electronic mail systems, instant messaging systems, SMS systems, voice messaging systems, and the like. Based on the monitoring of these communications, the unified communication monitoring system may send notifications to client computing devices 110, 112, and 114 when one recipient of a communication is responding to the communication, regardless of which communication system the recipient is using to respond to the communication. This notification may include an identification of the communication system being used by the recipient to respond to the communication.

These notifications may be received by other recipients of the original communication at their computing devices. Their computing devices include client applications associated with the unified communication monitoring system for outputting notifications received from the unified communication monitoring system in a manner that the user is informed of who is responding to the original communication and by what communication system that user is responding to the original communication. Moreover, this client application may further provide a user interface through which a user may immediately access the communication system being used by the person responding to the original communication.

Figure 3:
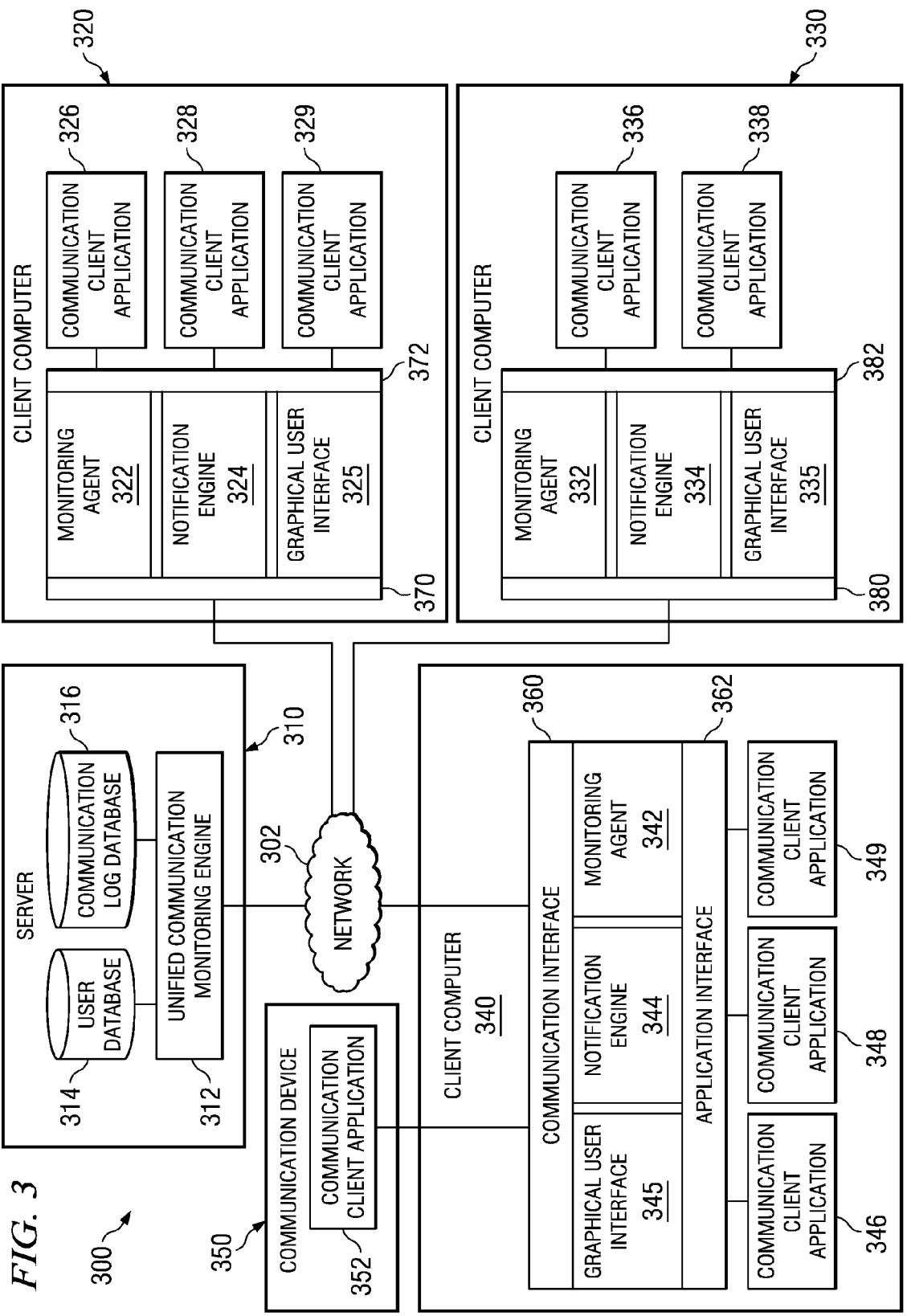
FIG. 3 is an exemplary block diagram of the primary operational components of a unified communication monitoring system in accordance with one illustrative embodiment.

FIG. 3 is an exemplary block diagram of the primary operational components of a unified communication monitoring system in accordance with one illustrative embodiment. As shown in FIG. 3, the unified communication monitoring system 300 comprises a server 310 executing a unified communication monitoring system 312. The unified communication monitoring engine 312 communicates with monitoring agents 322, 332, and 342 and notification engines 324, 334, and 344 executing on client computing devices or communication devices 320, 330, and 340, respectively, via the data network 302. The unified communication monitoring engine 312 receives information from the monitoring agents 322, 332, and 342 identifying attributes of communications being composed via the communication client applications 326-329, 336-338, and 346-349 of the client computing devices 320, 330, 340 and external communication device 350. The unified communication monitoring engine 312 may correlate these attributes with communication logs of in the communication log database 316 to identify a previous communication with which the currently being composed communication is associated, if any. Based on the identification of a previous communication, the unified communication monitoring system 312 may identify recipients of the previous communication and may send a notification message to the notification engines 324, 334, and 344 of the corresponding client computing devices 330 indicating the party currently involved in composing a related communication.

In correlating attributes of a currently being composed communication with a previous communication, user identifier information may need to be retrieved from the user database 314 to ensure that the previous communication is indeed related to the currently being composed communication. In one illustrative embodiment, a user may utilize the same user identifier for all types of communications, e.g., electronic mail, instant messaging, SMS text messaging, voice messaging, etc. In another illustrative embodiment, different user identifiers may be used in two or more of these various types of communication. Correlation between user identifiers may be made by way of profile entries in the user database 314. In this way, if an attribute of a currently being composed communication identifies one user identifier, and a previous communication identifies a different user identifier for the same user, the correlation may be made by way of the user database 314 and thus, the currently composed communication may be correctly correlated with the previous communication. The particular information stored in the user database 314 may be provided via a registration process whereby a user of a client computing device 320, 330, or 340 communicates with the server 310 to provide information regarding the user's various user identifiers used for the different communication client applications and/or communication devices used by the user to communicate via the data network 302.

The communication log database 316 preferably maintains a log of communications sent to and from the client computing devices 320, 330, and 340, and external communication device 350, via the various communication client applications 326-329, 336-338, 346-349, and 352. In order to avoid correlation of currently being composed communications with previous but stale communications, the communication log database 316 may have limited storage capacity such that communications older than a predetermined period prior to a current time may be automatically deleted from the communication log database 316 on a regular or periodic basis. This predetermined time period may be a matter of minutes, hours, days, or the like. The entries in the communication log database 316 may not contain an entire communication but only those attributes necessary for correlating subsequent communications with the previously distributed communication. Such attributes may include, for example, user identifiers associated with the previously distributed communication, a subject text associated with the previously distributed communication, extracted keywords from the previously distributed communication, and the like.

These attributes may be extracted from the previously distributed communication by the unified communication monitoring engine 312. For example, the unified communication monitoring engine 312 may extract user identifier information from a "to" field and a "from" field of an electronic mail message, an instant message, a SMS text message, or the like.

Subject matter text may be extracted from a subject line field of an electronic mail message, instant message, SMS text message, or the like. Keywords may be extracted from the subject line field as well as the body of an electronic mail message, instant message, SMS text message, or the like. Similar keyword information may be obtained for voicemail messages using voice recognition software that may extract such keywords in a manner generally known in the art. Identification of originating communication device identifiers and voice mailbox identifiers may be identified by the unified communication monitoring engine 312 to determine similar information as may be obtained from the "to" field and "from" field of the text based messages.

The various extracted attributes may be used to populate an entry in the communication log database 316. If the communication from which the attributes were extracted is related to a previously distributed communication, the new entry in the communication log database 316 may be linked, such as via one or more pointers, to an entry corresponding to the previously distributed communication. Alternatively, the new entry may be used to replace the entry associated with the previously distributed communication such that only the most recent message in a chain of related messages is maintained within the communication log database 316.

As shown in FIG. 3, the client computing devices 320, 330, and 340 may execute one or more communication client applications 326-329, 336-338, and 346-349 for communicating with users of other client computing devices via the data network 302. These communication client applications 326-329, 336-338, and 346-349 may be text based communication clients, such as electronic mail clients, instant messaging clients, SMS text messaging clients, or the like. Alternatively, these communication client applications 326-329, 336-338, and 346-349 may include voice based communication client applications, such as Voice-over-IP (VoIP) client applications, voicemail applications, and the like. Any other type of data based communication may further be included in the possible communication client applications 326-329, 336-338, and 346-349 without departing from the spirit and scope of the present invention.

The client computing devices 320, 330, and 340 further execute monitoring agents 322, 332, and 342, notification engines 324, 334, and 344, and graphical user interface 325, 335, and 345, respectively. The monitoring agents 322, 332, and 342, and in some embodiments the notification engines 324, 334, and 344, communicate with the unified communication monitoring engine 312 via a communication interface 360, 370 and 380, respectively. Alternatively, all communications to/from the unified communication monitoring engine 312 may flow through the monitoring agent 322, 332, and 342, respectively. The monitoring agent 322, 332, and 342, as well as the notification engine 324, 334, and 344 may communicate with the communication client applications 326-329, 336-338, and 346-349, via the application interface 362, 372, and 382, respectively.

The monitoring agents 322, 332, and 342 monitor and analyze the communications being composed or sent by a user via the communication client applications 326-329, 336-338, and 346-349 of the respective client computing devices 320, 330, and 340. In response to a user initiating the composition of a communication, e.g., by selecting a "reply" button, a "new" button, initiating a call, or other initialization operation, the monitoring agents 322, 332, and 342 may monitor the composition of the communication while the communication is being composed and provides attributes of the currently being composed communication to the unified communication monitoring engine 312 for use in correlating the currently being composed communication with a previously distributed communication. For example, in a similar manner that the unified communication monitoring engine 312 may extract attribute information from communications, the monitoring agent 322, 332, and 342, may extract attribute information from the currently being composed communication. The main difference is that with the currently being composed communication, the attributes may change as the user changes information input to the communication client application 326-329, 336-338, and 346-349. Thus, the monitoring agents 322, 332, and 342 may continuously, or periodically, monitor and analyze the attributes of communications being composed in a dynamic manner using the various communication client applications 326-329, 336-338, and 346-349.

With regard to the communication device 350, communications generated using the communication client application 352 may be sent by the communication device 350 and transmitted across the network 302 via the client computing device 340 but with the communication device 350 being separate from the client computing device 340. As such, the monitoring agent 342 may monitor currently being composed communications of the communication device 350 by polling the communication device 350 or otherwise requesting attribute information from the communication client application 352 of the communication device 350.

The attributes of the currently being composed communication may be sent to the unified communication monitoring engine 312 which may compare these attributes to attributes of previously distributed communications logged in the communication log database 316. If the attributes include user identifiers, these user identifiers may be looked-up in the user database 314 to retrieve other user identifiers that are used by the same user with the same or different communication client applications 326-329, 336-338, and 346-349. Each user identifier, either extracted from the currently being composed communication or retrieved from the user database 314, may be correlated with user identifier information associated with previously distributed communication attribute information in the entries of the communication log database 316.

The matching of user identifiers associated with the currently being composed communication with previously distributed communications may be used in combination with matching of other attributes of the currently being composed communication. For example, keywords, subject lines, and other attributes of the currently being composed communication may be matched with similar attributes of previously distributed communications. The amount of attributes matched may be used to generate a score associated with each previously distributed communication to identify a most likely candidate for a previously distributed communication matching the currently being composed communication. This score may be compared against a minimum score required to identify a corresponding previously distributed communication. If the score is above the minimum score and is the highest score for a previously distributed communication, then the previously distributed communication is determined to be associated with the currently being composed communication.

After having identified a previously distributed communication that is associated with the currently being composed communication, the unified communication monitoring engine 312 sends the recipients of the previously distributed communication, as identified by the attributes in the communication log database 316, a notification message indicating that the user associated with the currently being composed communication is in the process of responding to the previously distributed communication. That is, the notification message indicates the identity of the previously distributed communication (such as by subject line, sender, etc.), the identity of the user that is currently involved in composing a communication in response to the previously distributed communication, and a type of communication client application being used to compose the response to the previously distributed communication. It should be appreciated that the identity of the user specified in the notification message may correspond to the communication client application used to send the previously distributed communication. Alternatively, the identity of the user may specify both the identity of the user with regard to the communication client application, e.g., electronic mail address, used to send the previously distributed communication as well as the user identity for the communication client application, e.g., instant messaging identifier, being used to compose the response.

In response to receiving the notification message from the unified communication monitoring engine 312, the notification engines 324, 334, and 344 executing on the respective computing devices 320, 330, and 340 operate to output notifications to users of the computing devices 320, 330, and 340 in a manner perceivable by the users to inform them of a party responding to the previously distributed communication. These notifications may take the form of textual messages, graphical representations, audible outputs, and the like. The notifications may have different characteristics including blinking representations, different colors, changing colors, particular sounds characteristic of an alert, or the like. These notifications may be output via a specific unified user interface 325, 335, or 345 provided for use with the unified communication monitoring engine 312. Alternatively, or in addition, the notifications may be output in a graphical user interface associated with the particular communication client application 326-329, 336-338, and 346-349 which is augmented to include the notification.

For example, the notification may take the form of a graphical icon, flashing field associated with a user identifier, or the like, in a compose or send electronic mail message window. In one illustrative embodiment, the icon or flashing field may be present within a "to" or "cc" field of the electronic mail message window. In another illustrative embodiment, a separate graphical user interface is provided that identifies the possible communication client applications that may be used to respond to a previously distributed communication with an icon, emphasis feature, or the like, being associated with the communication client application that is actually being used by a user to respond to the previously distributed communication. The particular icon, emphasis feature, textual notification, audible notification, or the like, may be specific to the type of communication client application being used to compose the response to the previously distributed communication. Thus, there may different notifications, e.g., icons, for electronic mail client applications, instant messaging client applications, SMS text messaging client applications, voice messaging client applications, and the like.

For example, in one illustrative embodiment, while one recipient is typing a response to an electronic mail message previously distributed to multiple to/cc recipients, a second recipient initiates a reply via electronic mail and is still in the compose phase of generating the electronic mail message. When this alternate reply is initiated, the, an instant messaging "typing" icon may be displayed preceding the name or identifier associated with the second recipient in the "to"/"cc" address list of the first recipient. Once the response is completed by the second recipient, and the electronic mail message is sent, an icon showing an envelope may be displayed preceding the name or identifier of the second recipient to indicate that the response electronic mail message has been sent. Thus, the notification may be dynamically updated depending on the state of composition of the response to the previously distributed communication. This may be achieved through the monitoring by the monitoring agents 322, 332, and 342.

The notification may be user selectable in order to access the communication client application on the current computing device corresponding to the communication client application used to compose and send the response communication. For example, by double clicking the icon before the second recipients' name or identifier in the electronic mail message composition window, an inbox of an electronic mail client application may be opened or brought to the forefront of the display so that the response message sent by the second recipient may be viewed.

In addition to the above, the notification engine 324, 334, and 344 may further provide additional notifications in response to user actions on the communication client applications 326-329, 336-338, and 346-349 with regard to a communication thread associated with a previously distributed communication to which another recipient is responding. For example, if a user of a an electronic mail client application on computing device 320 composes a response message to a previously distributed communication, but before sending the electronic mail message the computing device receives a notification message from the unified communication monitoring engine 312, a warning message may be output in response to the user attempting to send his/her electronic mail message. That is, for example, in response to the user selecting the "send" button in the electronic mail client application graphical user interface, the notification engine 324 may output a warning message indicating that another recipient is in the process of responding to the same previously distributed communication and requesting confirmation of the user's intent to send his/her electronic mail message. In this way, the user is informed of potentially duplicate responses and given the option to not send their response or save their response as a draft until it is determined that the response electronic mail message should be sent.

Figure 4:
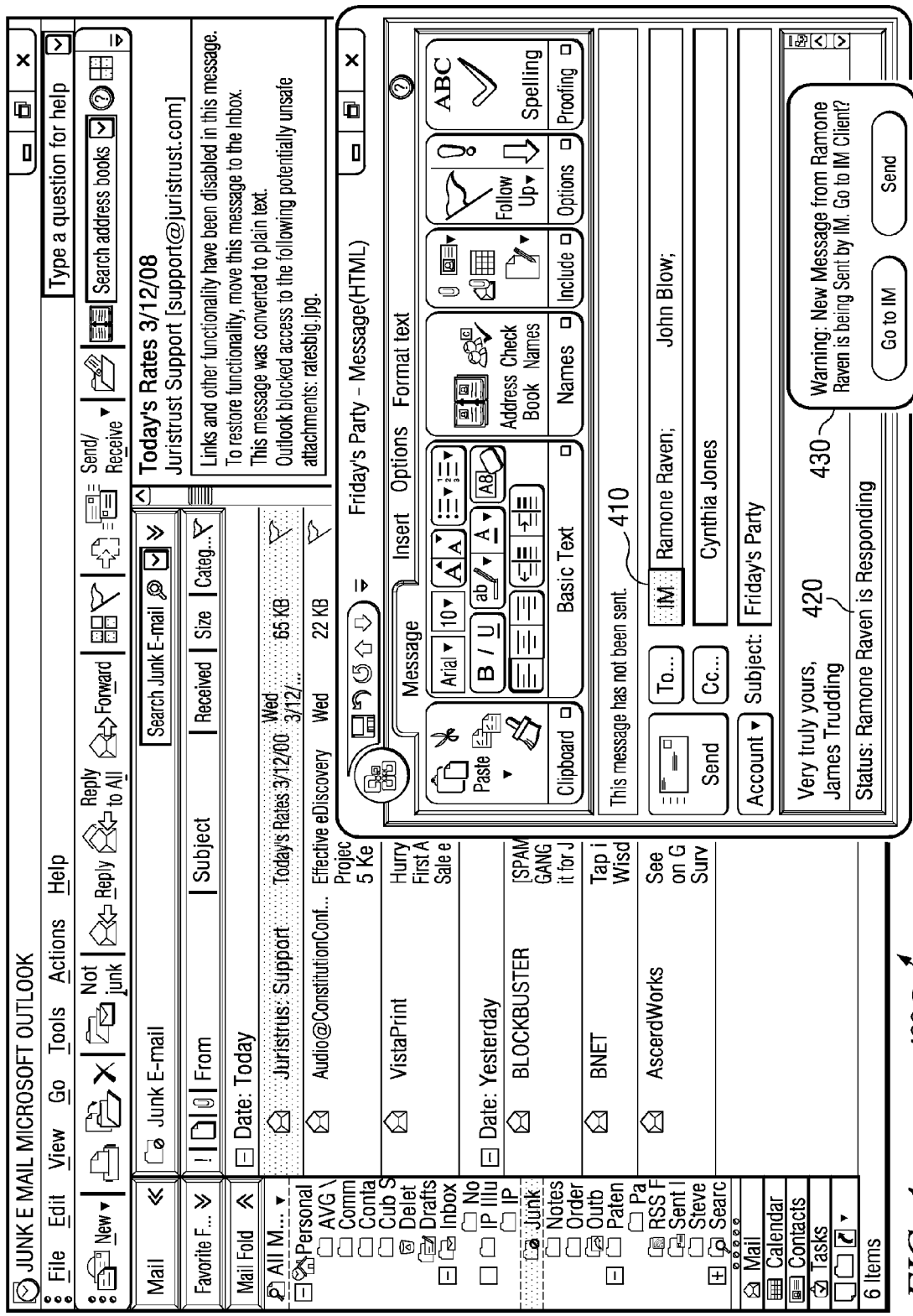
FIG. 4 is an example diagram of a graphical user interface for displaying a notification of a status of another recipient responding via a same or different type of communication client application.

FIG. 4 is an example diagram of a graphical user interface for displaying a notification of a status of another recipient responding via a same or different type of communication client application. The particular graphical user interface shown in FIG. 4 is for an electronic mail client application. As shown in FIG. 4, in response to a notification message being received, an icon 410 may displayed in association with a user's name or identifier in the graphical user interface 400. In this instance, the icon is representative of a instant messaging text messaging response being composed. In addition, or as an alternative, the graphical user interface 400 may have a field 420 for displaying a current response status associated with the thread of communications. Moreover, as discussed previously, in response to a user composing their own response message via the graphical user interface 400 and selecting a "send" button, a warning message 430 may be displayed to inform the user that another recipient is responding to the previously distributed communication.

Figure 5:
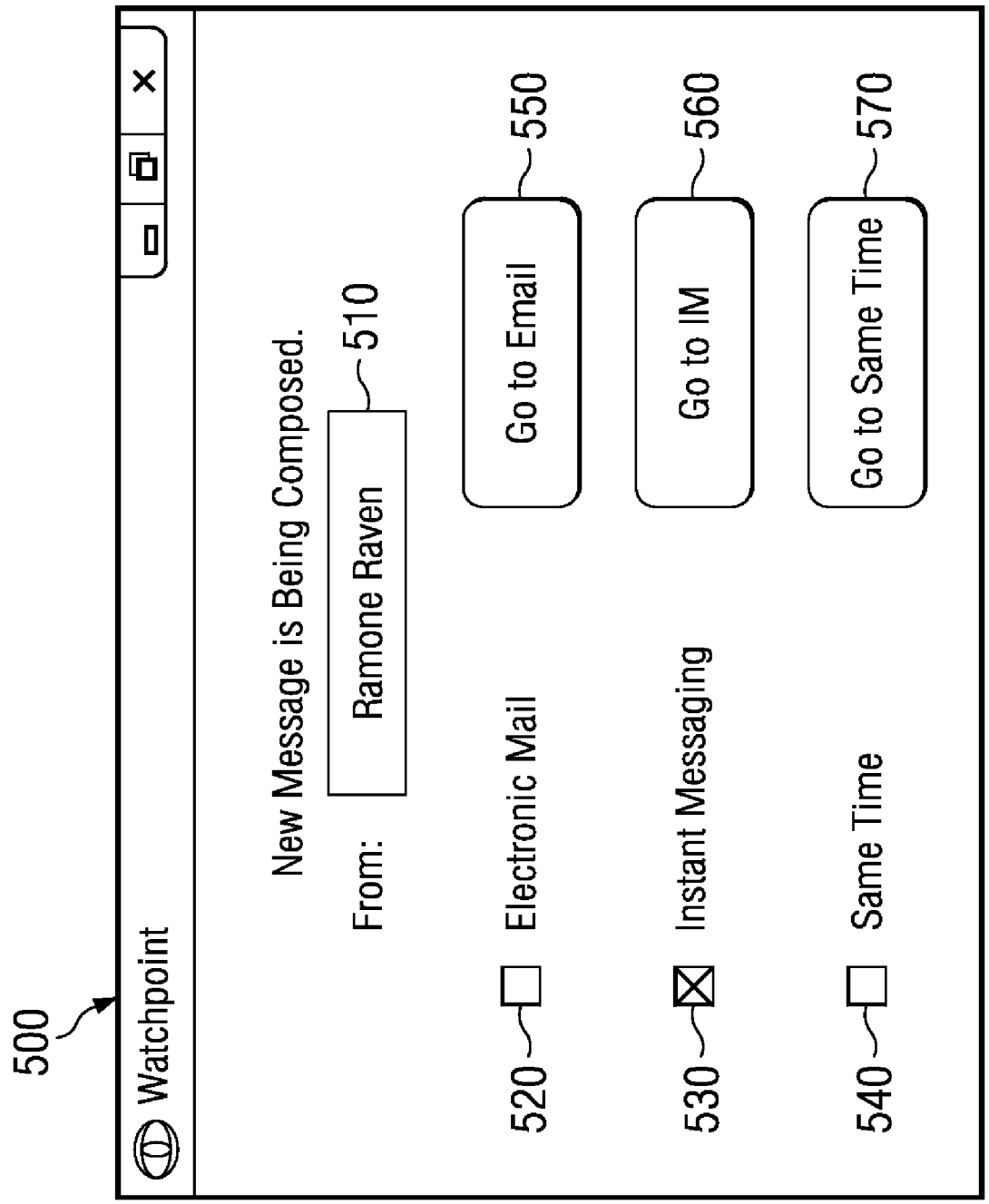
FIG. 5 is an exemplary graphical user interface for identifying a communication client application type being used by a user to response to a previously distributed communication.

FIG. 5 is an exemplary graphical user interface for identifying a communication client application type being used by a user to response to a previously distributed communication. The graphical user interface 500 in FIG. 5 may be generated an output by the notification engine 324, 334, and 344 as a separate notification output separate from the communication client applications 326-329, 336-338, and 346-349. As shown in FIG. 5, the graphical user interface 500 includes a field 510 for identifying the user responding to the previously distributed communication and fields 520-540 for specifying which communication client type is being used by the user identified in field 510 to respond to the previously distributed communication. In addition, the graphical user interface 500 may include user selectable elements, such as virtual buttons, 550-570 that may be selected to immediately go to a corresponding communication client application. Thus, if the user identified in field 510 is using instant messaging to respond to a previously distributed communication, by pressing the "go to" button 570, a corresponding instant messaging application may be opened or brought to the forefront of a display of the present computing device.

Figure 6:
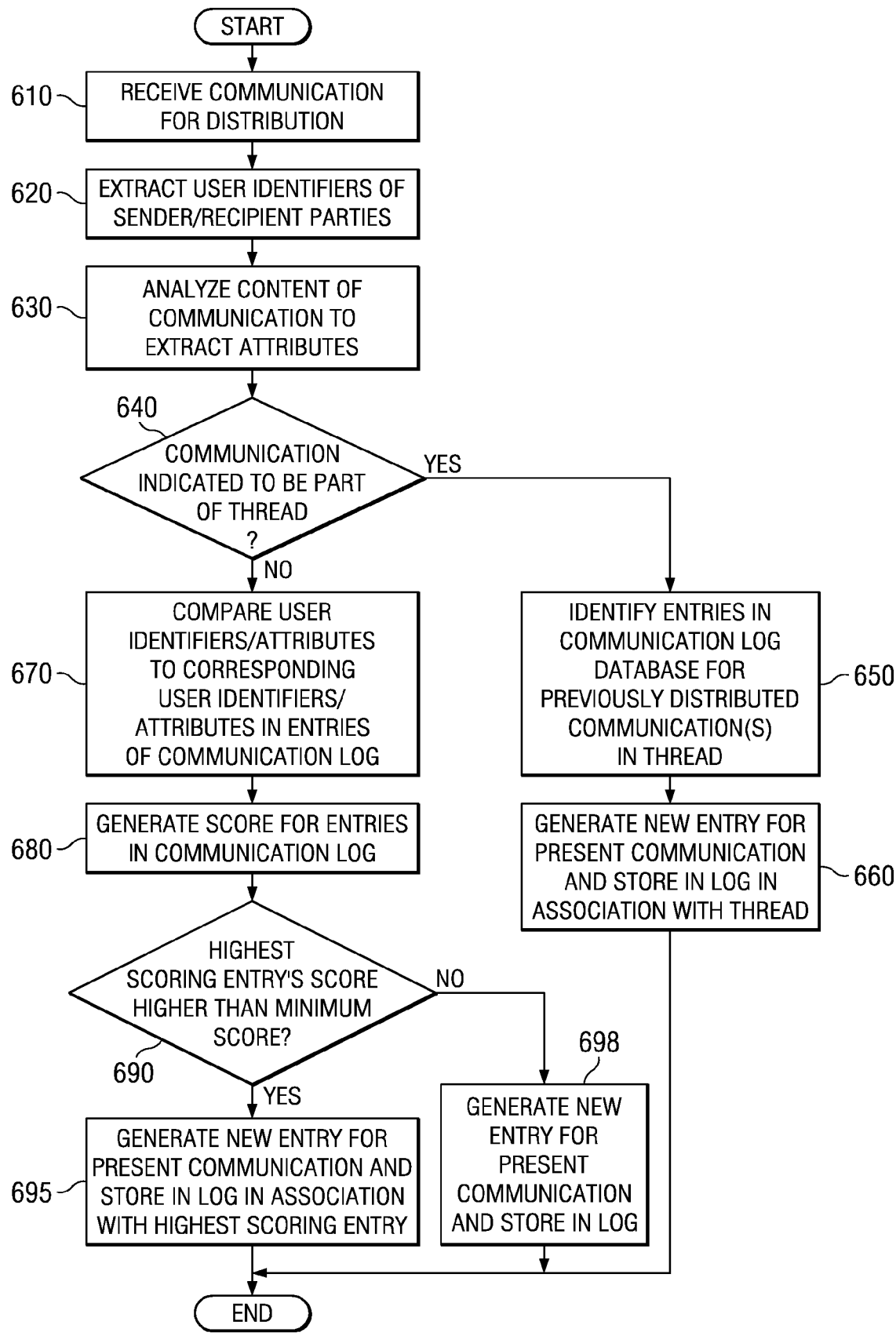
FIG. 6 is a flowchart outlining an exemplary operation for generating a communication log entry in accordance with one illustrative embodiment.

FIG. 6 is a flowchart outlining an exemplary operation for generating a communication log entry in accordance with one illustrative embodiment. As shown in FIG. 6, the operation starts with the receipt of a communication for distribution to a plurality of identified receiving parties (step 610). User identifiers of the sender and recipient parties are extracted (step 620). Content of the communication is analyzed to extract attributes of the communication, e.g., subject line, keywords, etc. (step 630). A determination is made as to whether the communication is indicated to be part of a thread of communications, e.g., if the communication was generating by selecting a reply option, forward option, or the like (step 640). If the communication is part of a thread of communications, entries in the communication log database for the previously distributed communication(s) in the thread of communications are identified (step 650) and a new entry for the present communication is generated and stored in association with the thread of communications (step 660). This new entry may include fields specifying the various user identifiers and attributes of the present communication, for example.

If the communication does not specify that it is part of a thread of communications, the communication may still be related to a previous communication but is not specifically identified as being related for various reasons. In this instance, the user identifiers extracted from the communication as well as the other extracted attributes are compared to corresponding user identifiers and attributes of previously distributed communications in the communication log database (step 670). A score is generated for the entries in the communication log database to determine a most likely candidate of a related communication log entry (step 680). A highest scoring entry is selected and its score is compared against a minimum score for consideration as a related communication (step 690). If the highest scoring entry's score meets the minimum score requirements, then an entry for the current communication is generated based on the extracted user identifiers and attributes and added to the communication log database in association with the highest scoring entry (step 695). If the highest scoring entry's score does not meet the minimum score requirements, then the entry for the current communication is still generated based on the extracted user identifiers and attributes but is not associated with the highest scoring entry (step 698). The operation then terminates.

Figure 7:
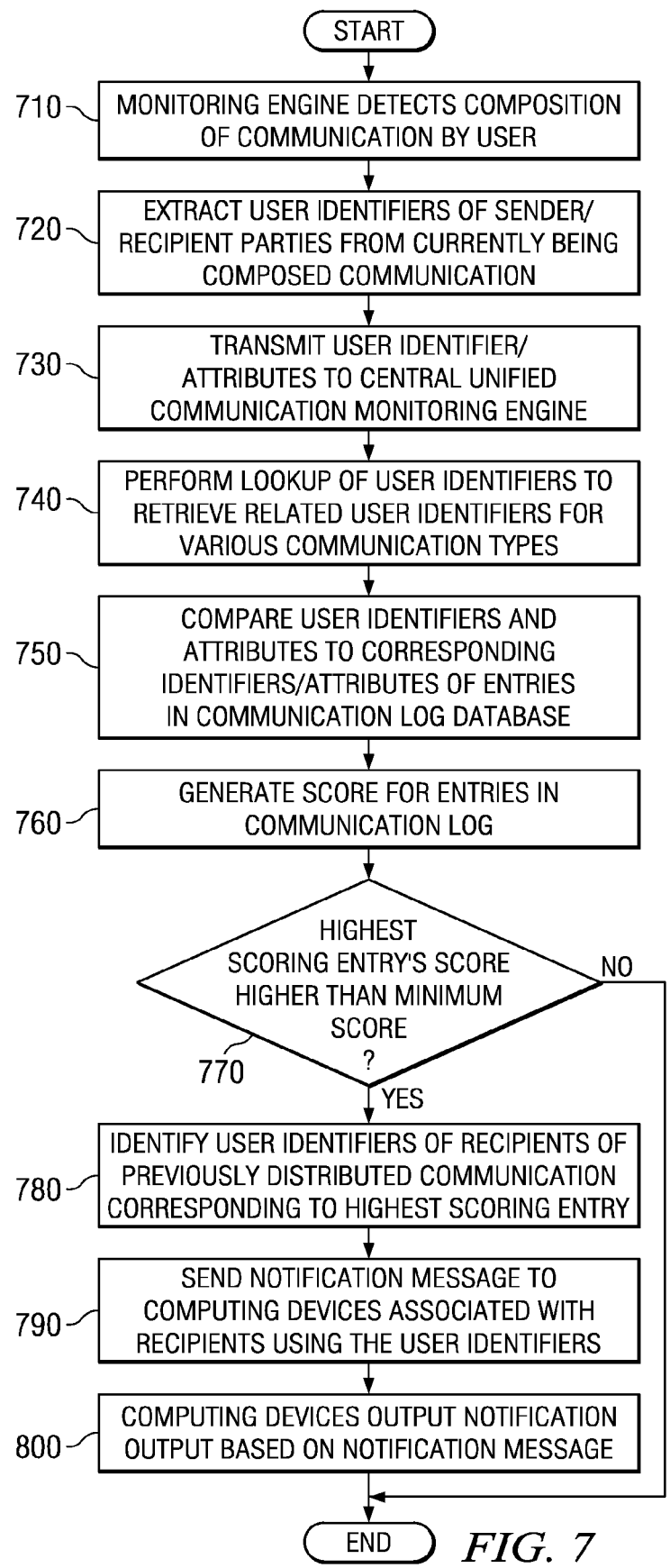
FIG. 7 is a flowchart outlining an exemplary operation for generating a notification message in accordance with one illustrative embodiment.

FIG. 7 is a flowchart outlining an exemplary operation for generating a notification message in accordance with one illustrative embodiment. As shown in FIG. 7, the operation starts with a monitoring agent on a client computing device detecting the use of a communication client application to compose a communication (step 710). The monitoring agent extracts user identifier and attribute information from the currently being composed communication (step 720) and transmits this user identifier and attribute information to a central unified communication monitoring engine (step 730). The central unified communication monitoring engine performs a lookup operation on the user identifiers in a user database to identify other user identifiers associated with those extracted from the currently being composed communication (step 740). The user identifiers extracted from the currently being composed communication, as well as those retrieved from the user database, are used along with the extracted attribute information to compare to entries in the communication log database (step 750). A score is generated for the entries in the communication log database to determine a most likely candidate of a related communication log entry (step 760). A highest scoring entry is selected and its score is compared against a minimum score for consideration as a related communication (step 770).

If the highest scoring entry's score meets the minimum score requirements, then the user identifiers of recipients of the previously distributed communication corresponding to the highest scoring entry are identified (step 780). A notification message is sent to the computing devices associated with these recipients using their user identifiers (step 790). The notification message preferably includes an identifier of the user currently composing a communication, an identifier of the related previously distributed communication, and an identifier of a type of communication client application being used by the user currently composing the communication. This information is used by the computing devices of the recipients of the notification messages to generate notification alerts output by the computing devices indicating the user presently composing a communication as well as the communication client application type being used to compose the communication (step 800). The operation then terminates.

Thus, the illustrative embodiments provide a mechanism by which a recipient of a previously distributed communication may be informed of another recipient currently engaged in responding to the previously distributed communication. Such notifications may be performed across various types of communication systems using different communication client applications, such as electronic mail, instant messaging, SMS text messaging, voice messaging, and the like. The notifications may identify the particular recipient currently involved in responding to a previously distributed communication as well as the type of communication system they are using to respond to the previously distributed communication. The notifications may be user selectable via a user's computing device or communication device such that a corresponding communication client application on the computing device or communication device may be accessed in order to receive the currently being prepared response communication.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing a notification of a recipient of a previously distributed communication responding to the previously distributed communication, comprising:

receiving, by a unified communication monitoring engine in a server, an indication from a monitoring agent on a client communication device of a communication currently being composed by the recipient on the client communication device using one of a plurality of different communication types;

identifying, by the unified communication monitoring engine, the previously distributed communication related to the communication currently being composed, wherein the previously distributed communication is of a different communication type than that of the communication currently being composed, wherein identifying, by the unified communication monitoring engine, the previously distributed communication related to the communication currently being composed comprises:

extracting, by the unified communication monitoring engine, attributes of the communication currently being composed;

comparing, by the unified communication monitoring engine, the extracted attributes to attributes of previously distributed communications logged in a communication log data structure; and selecting, by the unified communication monitoring engine, a previously distributed communication as being related to the communication currently being composed based on results of the comparison;

identifying, by the unified communication monitoring engine, other recipients of the previously distributed communication; and sending, by the unified communication monitoring engine, a notification message to other communication devices associated with the other recipients of the previously distributed communication, wherein the one or more communication devices output a notification output identifying that a communication is currently being composed by one of the other recipients in response to the previously distributed communication.

2. The method of claim 1, wherein the indication of the communication currently being composed comprises attribute information for the communication currently being composed, the attribute information including an identifier of a communication type currently being used to compose the communication, wherein the notification message identifies a communication type being used to compose the communication currently being composed, and wherein the notification output identifies the communication type being used to compose the communication currently being composed.

3. The method of claim 1, wherein the extracted attributes include user identifiers for at least one of target recipients of the communication currently being composed or a sender of the communication currently being composed.

4. The method of claim 3, wherein identifying, by the unified communication monitoring engine, the previously distributed communication related to the communication currently being composed further comprises:

performing, by the unified communication monitoring engine, a lookup operation in a user database in the server for each of the user identifiers to identify one or more related user identifiers, wherein the comparison of the extracted attributes to attributes of previously distributed communications comprises performing, by the unified communication monitoring engine, a comparison of all of the extracted user identifiers, and their related user identifiers obtained from the lookup operation, against user identifiers associated with the previously distributed communications.

5. The method of claim 1, wherein the extracted attributes comprise at least one of a subject text associated with the communication currently being composed or keywords extracted from a body of the communication currently being composed.

6. The method of claim 1, wherein extracting attributes of the communication currently being composed is performed dynamically on a continuous or periodic basis as the communication is being composed.

7. The method of claim 1, wherein selecting, by the unified communication monitoring engine, the previously distributed communication as being related to the communication currently being composed based on results of the comparison comprises:

generating, by the unified communication monitoring engine, a score for each entry in the communication log data structure based on results of the comparison;

comparing, by the unified communication monitoring engine, each score for each entry against a minimum score required to identify a related previously distributed communication; and selecting, by the unified communication monitoring engine, a previously distributed communication corresponding to a highest scoring entry whose score is above the minimum score required to identify a related previously distributed communication.

8. The method of claim 1, wherein the notification message comprises an identity of the related previously distributed communication, an identity of a user composing the communication currently being composed, and a type of communication client application being used to compose the communication currently being composed.

9. The method of claim 1, wherein the notification output is a notification generated via an existing graphical user interface associated with a communication client application being used by the one or more communication devices which is augmented to include the notification.

10. The method of claim 2, wherein the notification output is selectable and, in response to selection of the notification output, a communication application corresponding to the communication type identified in the notification output is made immediately accessible to a user of the one or more communication devices.

11. The method of claim 2, wherein the one or more communication devices further output a user interface, separate from user interfaces of communication applications for composing communications existing on the one or more communication devices, through which users of the one or more communication devices may immediately access the communication applications on the one or more communication devices corresponding to the identified communication type being used to compose the communication.

12. The method of claim 2, wherein the communication type of the previously distributed communication is one of electronic mail, short message service (SMS), instant messaging, or voice messaging and wherein the communication type of the communication currently being composed is a different one of electronic mail, short message service (SMS), instant messaging, or voice messaging.

13. A computer program product comprising a non-transitory computer recordable medium having a computer readable program recorded thereon, wherein the computer readable program, when executed on a computing device, causes the computing device to:
  receive an indication from a monitoring agent on a client communication device of a communication currently being composed by a recipient on the client communication device using one of a plurality of different communication types;
  identify a previously distributed communication related to the communication currently being composed, wherein the previously distributed communication is of a different communication type than that of the communication currently being composed, wherein the computer readable program causes the computing device to identify the previously distributed communication related to the communication currently being composed by:
    extracting attributes of the communication currently being composed;
    comparing the extracted attributes to attributes of previously distributed communications logged in a communication log data structure; and
    selecting a previously distributed communication as being related to the communication currently being composed based on results of the comparison;
  identify other recipients of the previously distributed communication; and
  send a notification message to other communication devices associated with the other recipients of the previously distributed communication, wherein the one or more communication devices output a notification output identifying that a communication is currently being composed by one of the other recipients in response to the previously distributed communication.

14. The computer program product of claim 13, wherein the indication of the communication currently being composed comprises attribute information for the communication currently being composed, the attribute information including an identifier of a communication type currently being used to compose the communication, wherein the notification message identifies a communication type being used to compose the communication currently being composed, and wherein the notification output identifies the communication type being used to compose the communication currently being composed.

15. The computer program product of claim 13, wherein the extracted attributes include user identifiers for at least one of target recipients of the communication currently being composed or a sender of the communication currently being composed.

16. The computer program product of claim 15, wherein the computer readable program further causes the computing device to identify the previously distributed communication related to the communication currently being composed by:
  performing a lookup operation in a user database for each of the user identifiers to identify one or more related user identifiers, wherein the comparison of the extracted attributes to attributes of previously distributed communications comprises performing a comparison of all of the extracted user identifiers, and their related user identifiers obtained from the lookup operation, against user identifiers associated with the previously distributed communications.

17. The computer program product of claim 13, wherein the extracted attributes comprise at least one of a subject text associated with the communication currently being composed or keywords extracted from a body of the communication currently being composed.

18. The computer program product of claim 13, wherein the computer readable program causes the computing device to select the previously distributed communication as being related to the communication currently being composed based on results of the comparison by:
  generating a score for each entry in the communication log data structure based on results of the comparison;
  comparing each score for each entry against a minimum score required to identify a related previously distributed communication; and
  selecting a previously distributed communication corresponding to a highest scoring entry whose score is above the minimum score required to identify a related previously distributed communication.

19. The computer program product of claim 13, wherein the notification message comprises an identity of the related previously distributed communication, an identity of a user composing the communication currently being composed, and a type of communication client application being used to compose the communication currently being composed.

20. The computer program product of claim 13, wherein the notification output is a notification generated via an existing graphical user interface associated with a communication client application being used by the one or more communication devices which is augmented to include the notification.

21. The computer program product of claim 14, wherein the notification output is selectable and, in response to selection of the notification output, a communication application corresponding to the communication type identified in the notification output is made immediately accessible to a user of the one or more communication devices.

22. The computer program product of claim 14, wherein the one or more communication devices further output a user interface, separate from user interfaces of communication applications for composing communications existing on the one or more communication devices, through which users of the one or more communication devices may immediately access the communication applications on the one or more communication devices corresponding to the identified communication type being used to compose the communication.

23. An apparatus, comprising:
  a processor; and
  a memory coupled to the processor, wherein the memory comprises instructions which, when executed by the processor, cause the processor to:
  receive an indication from a monitoring agent on a client communication device of a communication currently being composed by a recipient on the client communication device using one of a plurality of different communication types;

identify a previously distributed communication related to the communication currently being composed, wherein the previously distributed communication is of a different communication type than that of the communication currently being composed, wherein the instructions cause the processor to identify the previously distributed communication related to the communication currently being composed by:

extracting attributes of the communication currently being composed;

comparing the extracted attributes to attributes of previously distributed communications logged in a communication log data structure; and selecting a previously distributed communication as being related to the communication currently being composed based on results of the comparison;

identify other recipients of the previously distributed communication; and send a notification message to other communication devices associated with the other recipients of the previously distributed communication, wherein the one or more communication devices output a notification output identifying that a communication is currently being composed by one of the other recipients in response to the previously distributed communication.

* * * * *